May 31, 1949.    M. P. CHAPLIN    2,471,932
MOLDED PULP APPARATUS AND METHOD
Original Filed April 5, 1937    3 Sheets-Sheet 1

INVENTOR
MERLE P. CHAPLIN,
BY
Riordan & Riordan
ATTORNEYS

May 31, 1949.  M. P. CHAPLIN  2,471,932
MOLDED PULP APPARATUS AND METHOD
Original Filed April 5, 1937  3 Sheets-Sheet 2

INVENTOR
MERLE P. CHAPLIN,
BY
Riordan & Riordan
ATTORNEYS

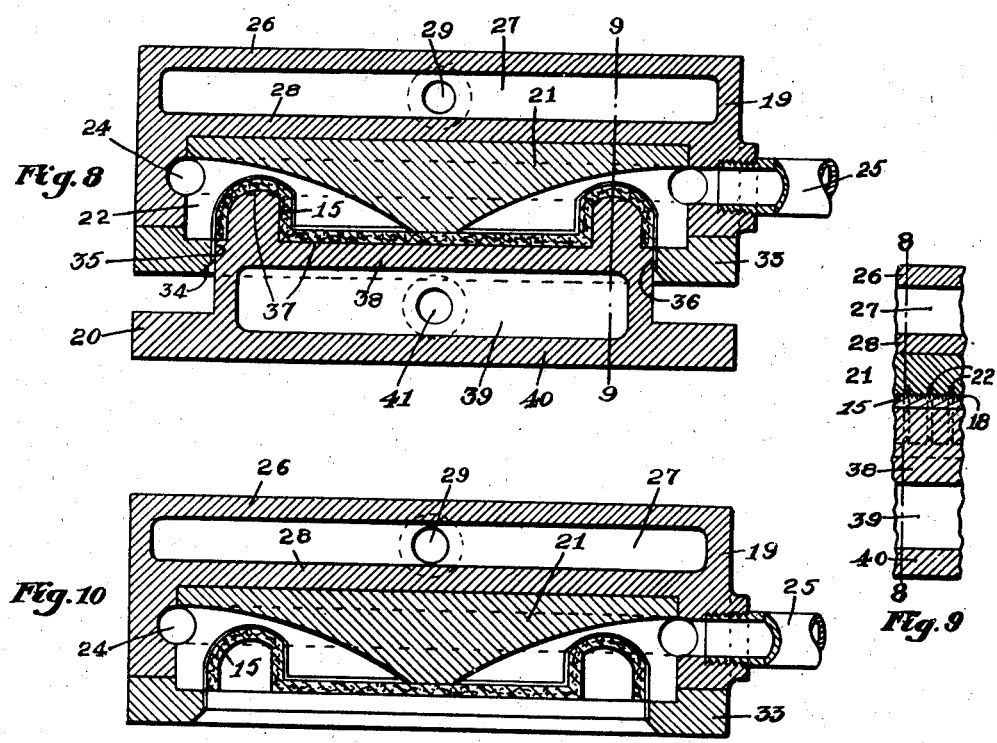

Patented May 31, 1949

2,471,932

UNITED STATES PATENT OFFICE 2,471,932

MOLDED PULP APPARATUS AND METHOD

Merle P. Chaplin, South Portland, Maine

Continuation of application Serial No. 135,033, April 5, 1937. This application December 23, 1941, Serial No. 424,205

24 Claims. (Cl. 92—54)

It is frequently desirable to produce articles by a pulp moulding process by depositing fibrous and other materials from an aqueous dispersion, on a foraminous mould, removing the larger part of the water during the moulding process, and subsequently removing the remainder by evaporation through the application of heat. It is also frequently desirable to incorporate with or on the fibrous materials prior to moulding other materials which may be fusible and partially volatile at the temperatures necessary to evaporate the moisture from the wet moulded article.

These fusible and volatile materials may under certain conditions be wholly or partially extracted or removed from the moulded article during the drying process and it is the purpose of this invention to provide means whereby these losses are greatly reduced. These materials otherwise may become fluid under the application of heat and thus escape from the article, or they may become volatilized and escape with the steam and vapor of evaporation while the article is heated during the drying operation.

This invention also provides a new type of moulding die and means for moulding and drying articles of novel and intricate shapes, also providing an efficient means for applying heat to the moulded article after formation for moisture evaporation.

For purposes of illustration, the article shown is a milk bottle cap shaped to form the seat or seal on the inside recess at the top of an ordinary glass milk bottle including a flange or circular rim-section adapted to fit over and cover a portion of the bead at the top of the milk bottle, protecting the pouring-lip against contamination.

The selection of the above mentioned article to illustrate and describe this invention is not to be interpreted as limiting the invention to this particular article, as a wide variety of articles of greatly differing shapes than that illustrated can be produced by the methods herein disclosed. The article illustrated is selected for the reason that this type of article normally contains a considerable amount of wax or other similar fusible material, and is an article of a somewhat intricate shape and adapted to particularly illustrate my novel methods hereinafter described—

Reference is made to the following drawings:

Fig. 8 is a sectional view on line 8—8, Fig. 9, and shows the article compressed between this second heated die and a third heated die located beneath the second die.

Fig. 9 is a sectional view on line 9—9 of Fig. 8, showing the vapor-escaping passages and the heat contacting surfaces.

Fig. 10 shows the dried and finished article still held by the second heated die, the third heated die having been removed.

Fig. 11 illustrates a plan view of the center portion of the die illustrated in Fig. 10, the left-hand portion of Fig. 11 being a view from the top and the right-hand portion of Fig. 11, a view from the bottom.

Fig. 12 illustrates an optional moisture escaping means or surface of central portion of the die of Fig. 10, this being optional with the surface illustrated in the right-hand part of Fig. 11.

Fig. 13 shows an enlarged section through the rim portion of the article illustrating diagrammatically the seared surface accomplished by the first heating and the concentration of the fusible materials in another portion of the article.

Fig. 14 is a perspective sectional view of the finished article.

Figure 1:
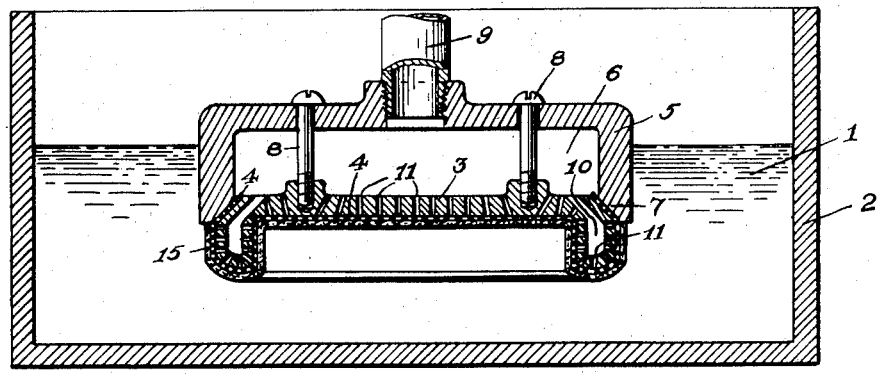
Fig. 1 illustrates the moulding die in the process of forming an article.

The pulp mixture 1 from which the moulded article is formed, is contained in tank 2, and the forming die is immersed therein facing downwardly as shown in Fig. 1. The die 3 is a perforated form of the proper shape and size to form the desired article, this form being covered with a fine wire screen or perforate plate 4, usually termed a "forming wire" or "forming member." The die and forming member are mounted on a holder 5 which for the particular purpose and article illustrated, forms not only a holder for the die 3 but also a chamber 6 behind the die, and carries a clamping means at 7, shown as an inward bevel, for securing the fine wire cloth covering or forming wire on the die in place against a corresponding inward bevel on the die section 3, with the edges of the forming member extending inwardly toward the interior of the member 5.

The die 3 is secured to the holder 5 by means of clamp screws 8. A pipe or tube 9 connects to the chamber 6 between the die and the holder through which air and water are removed while the article is being formed. The forming die is made of substantially uniform thickness, a cored or machined chamber 10 being provided in the rim portion as shown in order that the air and water drawn through the perforations 11 may readily escape into the chamber 6 and out of this chamber through pipe 9.

Figure 2:
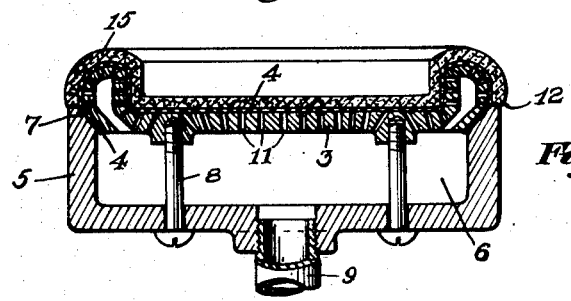
Fig. 2 illustrates the moulding die with the formed article thereon.

When the die and holder are immersed in the pulp mixture 1 contained in tank 2, suction is applied through pipe 9 to chamber 6, drawing the air therefrom, resulting in a flow or travel of the liquid contained in the pulp mixture 1, through the forming wire 4, and the die perforations 11. The forming wire 4 covering the die acts as a strainer or screen preventing the fibrous materials of the mixture 1 from passing through, resulting in a deposit or layer of these materials being retained by the screen over its entire surface, and the continued suction causes this layer to collect or build up to the desired thickness. As shown in Fig. 1, this layer has built up to approximately one-half of its normal or final thickness, and after a sufficiently thick layer has been deposited, the die and holder are removed from the mixture 1 in tank 2, and inverted as shown in Fig. 2. Suction is maintained in chamber 6 through pipe 9 for drawing off the remaining water contained in chamber 6, this water having been drawn through the screen and die perforations during the formation of the article.

It will be noted that the article is of substantially uniform thickness throughout, tapering off somewhat to the thickness of the rim or edge of the holder 5 at point 12. This tapering off of the thickness of the moulded article at this point is important in the case of the particular article illustrated, as it is not desired to have the rim or edge of this particular article thicker than other portions, which would normally result if the die covering wire or screen were clamped beneath an outwardly extending ring as is ordinarily done on pulp moulding dies and which results in a recess between the inner edge of this rim and the die itself, in which the pulp, during moulding, accumulates more rapidly than on other more exposed portions of the die surface. It will be noted that the thickness of pulp is definitely limited by the corner or thickness of the extending outer edge of the chamber portion 5, at the point 12 (Fig. 2) which definitely cuts off the vacuum from the traveling along the surface of the chamber or clamping member 5, and maintains a reduced thickness of pulp at this point with respect to the main wall of the article, even though the pulp may build out to a somewhat greater thickness along the main wall of the die portion 3. In other words, if the thickness of the edge of the member 5, at the point 12, were greater than the desired thickness of pulp at this point, as is usually the case with conventional clamping rings and masks, then the suction being applied would creep up along the side to a considerable height, causing a flashing or building up of pulp at this point. With the instant disclosure, as recited, the cut off of vacuum at the point 12 definitely limits and maintains a reduced thickness of pulp at this point, causing a tapering off, as illustrated in Fig. 2.

Further, the normal clamp ring construction usually employed for securing the forming wire in place would interfere with the removal of the article from the forming die as a portion of it would be compressed between this ring and a substantially vertical or parallel portion of the die itself. Also it would not be possible to bring a complementary die surface between the conventional type of clamp ring and the vertical die surface portion, hence it would be extremely difficult, if not impossible, to remove that portion of the article from the forming die.

Figure 3:
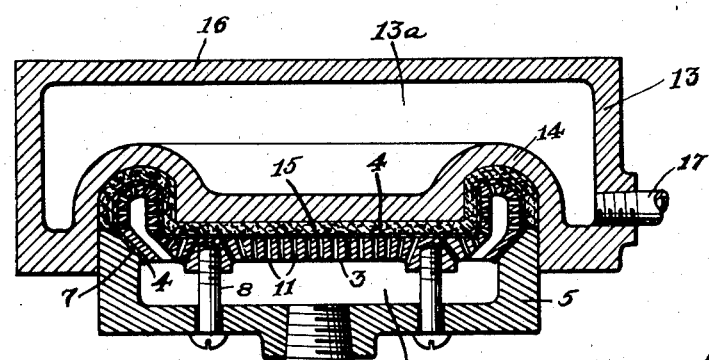
Fig. 3 shows the moulding die and article thereon in contact with a heating die for compacting and searing the article's surface.

As previously mentioned, in certain articles and particularly in the article illustrated, there is intermixed with the fibres or deposited on the fibres, certain materials having relatively low melting points and which materials may even become volatile at temperatures below the temperature at which the article is dried. In order to prevent or minimize the escape of this material from the article during the drying process, there is applied to the exposed obverse surface of the article, while still held on the forming die, a heated die member 13, as illustrated in Fig. 3. This die member has an inner surface and wall 14, shaped to properly compress and heat the surface of the article 15, held on the forming die 3. This die member may be provided with a chamber 13—a immediately behind and adjacent to, the inner wall 14, this chamber being inclosed by a wall 16, permitting the introduction of steam or other heating means through pipe 17. The heating means is not important as other heating means may be applied, and the method disclosed is simply illustrative.

Figure 4:
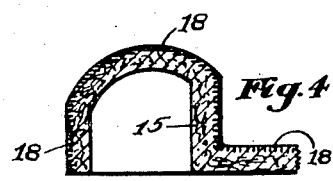
Fig. 4 is an enlarged fragmental radial sectional view of the rim of the article illustrated in Fig. 3, showing, diagrammatically, a certain portion of this article compacted and partially dried or seared.

The compression of the outer surface of the article 15, while held on die 3, compacts and partially dries a portion of the article at or near the surface, forcing the moisture and vapor through the wire screen 4, perforations 11, into the chamber 6, whence they are drawn off through pipe 9, this still being connected to suction means. The exposed obverse surface of the article 15 is thus rendered denser and firmer than the remainder of the article and forms in effect a filtering medium within a portion of the article itself, restraining and restricting the escape of fusible and volatile materials therethrough during the final drying stage hereinafter more completely described. This compacted filtering surface or layer is illustrated diagrammatically at 18 in Fig. 4.

Figure 5:
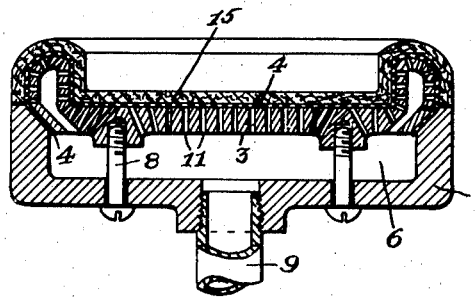
Fig. 5 illustrates the article still on the moulding die after its exposed surface has been seared.
Figure 6:
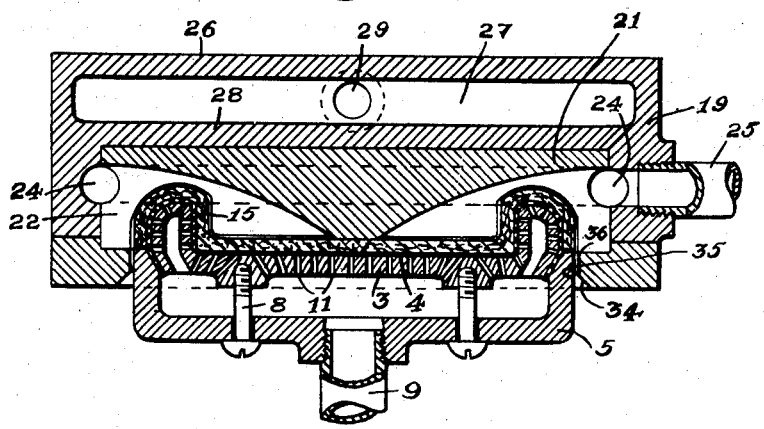
Fig. 6 shows the moulding die and article thereon in contact with a second heated die provided with moisture escaping passages.
Figure 7:
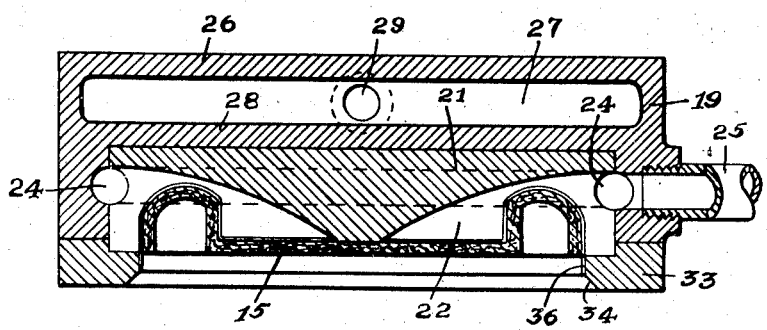
Fig. 7 shows the article left in this second-heating die the forming die having been removed.

After the article 15 has been partially dried and seared, as previously described, the article 15 is removed from the heated die 13, still being retained on the forming die 3 as shown in Fig. 5. The outer surface 18 of the article is then placed in contact with a second heated die 19, as illustrated in Fig. 6. The forming die 3 is then removed leaving the article in die 19 as illustrated in Fig. 7. For completion of the drying there is then applied to the article a third heated die 20, as illustrated in Fig. 8. Transfer of the article from die to die is accomplished by applying suction to the die on which the article is to be retained and forcing the article from the other die by compressed air.

The heated die 19 consists of a central portion 21, illustrated in plan view of both top and bottom portions in Fig. 11. This die contacts the surface of the article 15 through broad areas between either slots 22 as illustrated, in the right-hand part of Fig. 11 or between holes or perforations 23 as shown in Fig. 12. The slots 22 or the perforations 23, connect to a chamber section 24 which chamber section in turn connects to a pipe 25, on the exterior surface of the die 19, through which pipe the steam and moisture of evaporation from the article 15 is removed.

The central section 21, of die 19, is heated by any convenient means such as a steam chamber 27, enclosed by wall 26, on its outer surface and wall 28 on its inner surface, this wall being in immediate contact with the upper surface of part 21, and also with the outer surface of this part immediately adjacent to and surrounding chamber 24.

There may be introduced into chamber 27 through pipe 29, steam or other heating means, which effectively transfers its heat through wall 28, part 21, to the adjacent surface of article 15, with which it is in contact.

There is shown in Fig. 9, a sectional view of the second and third heated dies, this section being taken on line 9—9 of Fig. 8. In Fig. 9, it will be noted that the area of the central portion 21, of the upper hot die in contact with the article 15, is considerably greater than the openings 22, through which the steam and moisture of evaporation escapes. Also, that the heating medium in chamber 27, will effectively transfer its heat to the surface of the article adjacent to part 21, maintaining this portion of the article in a dense condition, which condition, while permitting the escape of steam and water vapor, effectively resists and retards the passage of any fusible materials which may tend to become volatilized during the final drying stages.

It has heretofore been the practice where articles are dried between a heated die and a holding die, or between two heated dies, to cover the surface of one of these dies with a perforated material in the form of wire cloth or perforated metal through which the vapor escapes over the entire surface of the article, being drawn off through holes in the die over which the wire screen or perforated metal is placed. The transfer of heat from the die member through the wire screen or perforated plate to the article, is relatively inefficient, due to the poor contact between either of these materials and the heated die itself, resulting in less heating and hardening of the surface of the article in contact with the screen or plate, than would be the case if there were no screen or plate between the heated die and the surface of the article. This results in the escape of volatile matters through this softened area and further the actual escape of certain of the softened fibres themselves, from the softened surface of the article into or through the screen or plate and into or through the perforations in the die holding this screen or plate.

These previous methods not only resulted in imperfect and inefficient drying of the moulded article, but also allowed certain materials of the moulded articles, which should be retained in the article, to escape. These materials are not only lost to the article, reducing its general utility and value, but their escape frequently causes trouble with and clogging of, the screen or plate, and the die perforations further decreasing their heat conductive properties and causing general inefficient operation. Fibrous and other materials became lodged in the screen, plate and die perforations requiring frequent removal of these dies from production for cleaning purposes.

Die 19, disclosed herewith and previously described, obviates the above mentioned difficulties and objections to previous designs by an efficient and uninterrupted heat transfer directly to the surface of the article to be dried, while providing sufficient opportunity for the steam and moisture evaporated from the article to escape. It will readily be seen in Fig. 9, that not only is the density and dryness of the layer 18 maintained as a filter medium, but also a comparatively wide spacing between slots 22 or the perforations 23, necessitates a longer path of travel for any volatilizable materials, further effecting and maintaining their retention in the article itself. The escape of steam or the water evaporation is not materially retarded as the fibrous materials are naturally porous, and readily permit and assist in the passage of water vapor therethrough under the influence and urge of applied heat.

To effect a closure of the outer end of slots 22, in part 21, and also to form an enclosing member for the outer edge of moulded article, when introduced into die 19, by the forming die 3, an enclosing ring 33, is provided as shown in Figs. 6, 7, 8, and 10. This ring 33, is provided with a beveled portion 34, facilitating the entrance of the moulded article while held on die 3. The inner diameter of this ring fits closely around the outer diameter of die holder 5, as shown at 35, effectively smoothing out any rough or uneven portions before the article is introduced into part 21. Further, this enclosing ring 33, closely fits around the outer diameter of the third heated die 20, as illustrated in Fig. 8. Directly opposite and below each of the grooves or slots 22, in part 21, is a small groove or slot 36 in the ring 33. This groove or slot 36, in the ring 33, is to permit any ridge or rib formed on the outer surface of the article 15, by its being compressed into slots 22, to be readily withdrawn from the die 21, after drying is completed. It will be noted from the drawings that the grooves 36, as well as vapor escape ducts or slots 22, extend in the direction of the draw of the die to permit of removal from the die of a ribbed article formed thereon.

The third heated die 20, is provided with an upper surface 37, shaped to conform to the desired inside size of the finished moulded article. It is provided with a heating chamber 39, an outer inclosing wall 38, the outer surface of which contacts the article 15. Steam or other heating medium may be introduced through pipe 41.

It will thus be seen that the moulded article is compressed between a heated die 20, located on the under side or below the article and a second heated die composed of 19 and 21, located above and contacting the upper surface of the article. The lower heated die 20, in this case is imperforate. The upper die 21, has passages for the necessary escape of the water vapor of evaporation. The result of this arrangement in combination with the use of the first heated die as shown in Fig. 3, the operation of which has already been described, is first, to insure the retention of any volatilizable wax or other similar materials, and second, the fusing of these materials by the heat of the two dies tends to concentrate these materials on the inner surface of the article 15, where they will have the greatest value and utility. These two conditions are illustrated in Fig. 13, the filter portion already described being shown at 18, and the concentration of the fused or melted wax or other material at 42.

It will be readily understood that Fig. 13 is diagrammatic, and there is no sharp line of demarkation between the main portion 15, of the article and that of either that of the filter portion 18 or of the concentrated fused waxed portion 42. It is equally obvious that the heaviest concentration of wax or other similar material which may have become fused or melted during the drying of the article will be concentrated at or near the surface indicated at 42, which surface in the particular article chosen for illustration, is in contact with the milk inside the bottle, on which this milk bottle closure is to be used.

The slots or holes in part 21, can if desired, be so arranged that a pattern or design may be imprinted on the surface of the article, as in the case of the bottle cap shown in Fig. 14. While the method of preparing the surface of the article before it contacts part 21, prevents any part of the article from being compressed deeply into the slots or perforations, still a sufficient marking or embossing may be imprinted on the surface of the article to create a distinctive and attractive appearance. This is a feature of my invention made possible by contacting the moulded pulp article's surface directly with a heated die surface without the interposing of perforated or screen materials.

As shown in Figs. 9 and 11, the slots 22 are quite narrow. This restricted width is necessary for if they were made wide and spacious, the pulp might be compressed into them for their full depth and thus tend to trap vapor generated during the heating and compressing operation. By making them narrow and restricted as shown, the pulp will enter these slots only for a limited portion of their depth to produce, in the finished article, the embossed or ribbed effect shown in Fig. 14 wherein it will be noted that the ribs thus formed extend lengthwise along the surface of the article in the direction of the draw of the dies on which such article was formed.

It is obvious that other articles can readily be made by the above described methods and can be produced in a manner, and the dies so arranged, that the surfaces where the melted or fused concentration will be most useful and desirable, will be on the bottom of the article's surface using gravity and the natural tendency of these fused materials to settle to bring them to the desired point or surface of the article to be produced.

It is obvious that not only can other articles than those described be produced by the methods heretofore described, but various modifications may readily be made in the mechanism, herein illustrated, without departing from the character and the scope of my invention.

This application is a continuation of my application Serial No. 135,033, filed April 5, 1937, now abandoned.

Having thus described my apparatus, and method of operation what I claim is:

1. A die for forming fibrous pulp articles from a mixture of fibres and water, comprising a perforated moulding portion and an imperforate chamber forming portion, a forming screen clamped between walls of said moulding and forming portions, said chamber forming portion presenting a shoulder of such shape and size as to limit and maintain the thickness of the moulded article at its edge reduced with respect to the thickness of the main wall of the article.

2. A forming die for moulding fibrous pulp articles, comprising a perforated die section contoured to approximately the shape of the desired moulded article, an inwardly beveled portion on said perforated die section, a forming screen overlying the surface of this die section, and a clamping and chamber forming screen adapted to engage the forming screen externally and clamp same against the beveled surface of the perforated die section, with the edges of said forming screen extending inwardly toward the interior of said clamping member.

3. A die for molding fibrous pulp articles, a portion of the outer moulding surface of which is substantially vertical to the normal die plane, a forming screen for the die surface including said substantially vertical portion, a clamp member for securing said forming screen in place between said clamp member and said die surface beyond the vertical portion, said clamp member extending outwardly from the substantially vertical die portion a distance not greater than the edge thickness of the moulded article, to present a shoulder of such size and shape as to define the desired edge thickness of the moulded article.

4. A die for applying heat to and removing vapor from a moulded fibrous pulp article, comprising a heated unitary member provided with an article contacting surface having vapor escaping openings in the form of narrow slots cut therein, said slots being parallel to the vertical or substantially vertical portions or parts of the moulded pulp article and communicating with a chamber in the back of the die, a conduit to permit the escape of vapor from the article through the slots into said chamber and thence out of the die, and means to heat the article contacting surface of the die, said heating means being located rearwardly of said surface.

5. A die for finishing and drying a moulded fibrous pulp article comprising a closed chamber with means for introducing heated vapor therein, a member having an article contacting surface contoured to the shape desired on the pulp article, said contoured article contacting surface being interrupted by slots, and a ring holding this contoured member in intimate contact with the walls of the aforementioned heating chamber.

6. A die for applying heat to and removing water vapor from a moulded fibrous pulp article comprising a member having an article contacting surface contoured to the exact shape of the finished article, a plurality of radial slots cut through and below said contoured surface, a chamber surrounding said slots, a conduit to permit the escape of vapor from said article through the slots into the chamber and thence out of the die, and means for applying heat to the slotted member.

7. A die for forming fibrous pulp articles from a mixture of fibers and water, comprising a perforated moulding die portion and an imperforate chamber forming portion, a forming screen clamped between walls of said moulding and forming portions at its edge portion, said edge portion being turned inwardly toward the interior of said chamber forming portion, said chamber forming portion presenting a shoulder of such shape and size as to limit and maintain the thickness of the moulded article at its edge reduced with respect to the thickness of the main wall of the article.

8. A die for forming fibrous pulp articles comprising a foraminous die portion contoured on one surface to substantially the desired shape of the moulded article and having a beveled portion on the opposite side at its outer edge, a chamber forming portion adapted to fit against the beveled portion of the foraminous portion, the beveled portion extending inwardly toward the interior of the chamber forming portion, a forming screen clamped adjacent its edge between said beveled portion and said chamber forming portion, said chamber forming portion extending outward from the forming screen to present a shoulder of such shape and size as to define the edge thickness of the moulded article.

9. A die for moulding fibrous pulp articles, a portion of the outer moulding surface of which is substantially vertical to the normal die plane, a forming member for the die surface including said substantially vertical portion, and having its edge turned inwardly with respect thereto, a clamp member for securing said forming member in place by external engagement therewith beyond the vertical portion, said clamp member extending outwardly from the substantially vertical die portion a distance not greater than the desired edge thickness of the moulded article, to present a shoulder of such size and shape as to limit and maintain the desired edge thickness of the moulded article reduced with respect to the thickness of the main wall thereof.

10. A die for moulding fibrous pulp articles, a portion of the outer moulding surface of which is substantially vertical to the normal die plane, a forming member for the die surface including said substantially vertical portion, and having its edge turned inwardly with respect thereto, a clamp member for securing said forming member in place by external engagement therewith beyond the vertical portion, said clamp member extending outwardly from the substantially vertical die portion a distance not greater than the desired edge thickness of the moulded article, to present a shoulder of such size and shape as to limit and maintain the desired edge thickness of the moulded article reduced with respect to the thickness of the main wall thereof, and said clamp member being shaped to provide a chamber forming portion of the die.

11. A die for moulding fibrous pulp articles, a portion of the outer moulding surface of which is substantially vertical to the normal die plane, a forming member for the die surface including said substantially vertical portion and having its edge turned inwardly with respect thereto, a clamp member for securing said forming member in place by external engagement therewith beyond the vertical portion, said clamp member extending outwardly from the substantially vertical die portion a distance not greater than the desired edge thickness of the moulded article, to present a shoulder of such size and shape as to limit and maintain the desired edge thickness of the moulded article reduced with respect to the thickness of the main wall thereof, said clamp member being shaped to provide a chamber forming portion of the die, and means to apply heat to an exposed surface of the moulded article.

12. A die for moulding fibrous pulp articles, a portion of the outer moulding surface of which is substantially vertical to the normal die plane, a forming member for the die surface including said substantially vertical portion and having its edge turned inwardly with respect thereto, a clamp member for securing said forming member in place by external engagement therewith beyond the vertical portion, said clamp member extending outwardly from the substantially vertical die portion a distance not greater than the desired edge thickness of the moulded article, to present a shoulder of such size and shape as to limit and maintain the desired edge thickness of the moulded article reduced with respect to the thickness of the main wall thereof, said clamp member being shaped to provide a chamber forming portion of the die, and means to apply suction to said first mentioned die portion.

13. A die for moulding fibrous pulp articles, a portion of the outer moulding surface of which is substantially vertically to the normal die plane, a forming member for the die surface including said substantially vertical portion and having its edge turned inwardly with respect thereto, a clamp member for securing said forming member in place by external engagement therewith beyond the vertical portion, said clamp member extending outwardly from the substantially vertical die portion a distance not greater than the desired edge thickness of the moulded article, to present a shoulder of such size and shape as to limit and maintain the desired edge thickness of the moulded article reduced with respect to the thickness of the main wall thereof, said clamp member being shaped to provide a chamber forming portion of the die, and simultaneously acting means to apply heat to the surface of the moulded article on said die, and to apply suction to said first mentioned die portion.

14. The method of producing a finished moulded fibrous pulp article which consists in depositing a layer of pulp on a foraminous forming die, of applying a heated, imperforate die to sear and densify the exposed obverse surface of said layer, of withdrawing through the foraminous forming die the moisture and vapor forced from the article by the application of heat, of thereafter applying heat and suction to said exposed obverse surface to partially dry the pulp layer at said exposed surface, and of applying a heated imperforate die to the reverse surface of the article to sear and densify said reverse surface.

15. An open face drying die comprising a body having an article engaging surface provided therein with vapor escape ducts extending lengthwise along said surface in the direction of the draw of the die and communicating with a chamber formed entirely within and by said die body, and said die body also having therein a steam chamber rearwardly of said article engaging surface for heating said surface to pulp drying temperature.

16. The method of producing a molded pulp article which consists in depositing a pulp article on a suitable forming die, thereafter transferring the thus formed article to and between a pair of cooperating pressure dies, one of which is a smooth surfaced imperforate die directly contacting with one surface of the article and the other of which is a smooth surfaced die also directly contacting with the article and having in its smooth article contacting surface narrow vapor escape ducts of a depth greatly exceeding their width and extending in the direction of the draw of this pressure die, forcing said pressure dies against the opposite faces of the article under sufficient power to force portions of the article which are in juxtaposition with said ducts to project into and for a portion only of the depth of the latter and form on said article projecting ribs, and heating at least one of said pressure dies while the article is under compression between them to heat-dry said article at least sufficiently to render the resulting structure permanent.

17. The method of producing a molded pulp article which consists in depositing a pulp article on a suitable forming die, thereafter, and while the article is on the forming die, subjecting the exposed surface of the thus formed article to heat to partially dry the surface strata thereof, thereafter removing the article from the forming die and positioning it between a pair of cooperating pressure dies, one of which is a smooth surfaced imperforate die directly contacting that surface of the article which previously contacted the forming die and the other of which is a smooth surfaced die directly contacting the surface of the article which has already been partially dried, said latter die having in its smooth article contacting surface narrow vapor escape ducts of a depth greatly exceeding their width and extending in the direction of the draw of this pressure die, forcing said pressure dies against the opposite faces of the article under sufficient power to force portions of the article which are in juxtaposition with said ducts to project into and for a portion only of the depth of the latter and form on said article projecting ribs, and heating at least one of said pressure dies while the article is under compression between them to heat-dry said article at least sufficiently to render the resulting structure permanent.

18. The method of drying molded pulp articles which comprises simultaneously applying both heat and pressure to both of the opposite sides of the pulp article by dies directly contacting the opposite sides of such articles, and contemporaneously removing heat-generated vapor from said article through narrow elongated slots of a depth greatly exceeding their width and formed in the article contacting surface of one of the dies, the pressure being sufficient to force surface portions of the article, which are juxtaposed with the slots, into and for a portion only of the depth of the latter and thus form projecting elongated ribs on the article.

19. The method of drying molded pulp articles which comprises simultaneously applying both heat and pressure to both of the opposite sides of the pulp article by dies directly contacting the opposite sides of such article, and contemporaneously removing heat-generated vapor from said article through elongated slots which are formed in the article contacting surface of one of such dies and which are of such restricted width that the pulp will enter such slots for only a portion of the depth of the latter during the said application of heat and pressure to the article, the pressure being sufficient to force surface portions of the article, which are juxtaposed with the slots, into and for a portion only of the depth of the latter and thus form projecting elongated ribs on the article.

20. An apparatus for die drying molded pulp articles, comprising a heated die with an imperforate article drying surface of the size and shape desired for one side of a finished pulp article, a second heated die with an article drying surface of the size and shape desired for the opposite side of such article, said article drying surface of said second die having therein narrow, elongated vapor escape openings of a depth greatly exceeding their width, a chamber connecting said vapor escape openings, and means to remove the vapor from said chamber.

21. An apparatus for die drying molded pulp articles, comprising a pair of heated compression dies having article contacting surfaces to contemporaneously directly engage a molded pulp article throughout the major portion of the opposite faces of such article, there being narrow, elongated vapor escape openings in the article contacting surface of one of said dies with said openings of a depth greatly exceeding their width and arranged parallel to the direction of compression of said dies, and an outlet duct communicating with said escape openings to remove vapor which enters said vapor escape openings from the articles between said dies.

22. Apparatus for drying molded pulp articles comprising a pair of coacting dies contoured to the shape desired for the finished article when the article is compressed between them, and means to apply heat to both dies, at least one of said dies having an article engaging face to directly contact the article and having in said face narrow slots of a depth greatly exceeding their width for the escape of vapor from the article while still maintaining the major portion of said article contacting face in direct contact with the pulp article.

23. Apparatus for applying heat to and evaporating water from molded pulp articles, comprising a pair of dies shaped to compress the article between them, means to heat both dies, one of said dies having the major portion of its surface in contact with the article and having in said surface narrow slots of a depth greatly exceeding their width and cut parallel to the height of said article, and a suction chamber connecting said slots.

24. The method of producing a molded pulp article which comprises: first molding a wet pulp article from liquid pulp on an open faced molding die, then removing said article from the molding die and placing it between open faced drying dies at least one of which is slotted to provide in its article contacting surface narrow vapor escape slots of a depth greatly exceeding their width and extending in the direction of the draw of the die and at least one of which drying dies is heated, forcing said drying dies together against the opposite faces of the interposed article with sufficient pressure to force surface portions of the article which are juxtaposed with the vapor escape slots to project into the latter whereby ribs are produced on the corresponding face of said article, holding the resulting article in contact with the slotted drying die until the article is dried sufficiently to render its structure permanent, and thereafter separating the drying dies and removing the article.

MERLE P. CHAPLIN.

REFERENCES CITED

The following references are of record in the file of this patent:

UNITED STATES PATENTS

| Number | Name | Date |
| --- | --- | --- |
| Re. 14,262 | Rivers | Feb. 20, 1917 |
| 166,447 | Barker | Aug. 10, 1875 |
| 190,654 | Wheeler | May 8, 1877 |
| 740,023 | Keyes | Sept. 29, 1903 |
| 1,377,342 | Harbrecht | May 10, 1921 |
| 1,705,780 | Olson | Mar. 19, 1929 |
| 1,707,430 | Chaplin | Apr. 2, 1929 |
| 1,730,564 | Ellis | Oct. 8, 1929 |
| 1,845,830 | Chaplin | Feb. 16, 1932 |
| 1,923,966 | Brennan | Aug. 22, 1933 |
| 1,983,553 | Manson | Dec. 11, 1934 |
| 2,038,721 | Desmond | Apr. 28, 1936 |
| 2,079,667 | Swift | May 11, 1937 |
| 2,081,740 | Farnham | May 25, 1937 |
| 2,082,409 | Manson | June 1, 1937 |
| 2,089,746 | Gray | Aug. 10, 1937 |

FOREIGN PATENTS

| Number | Country | Date |
| --- | --- | --- |
| 462,359 | Great Britain | Mar. 4, 1937 |